United States Patent [19]
Comer et al.

[11] Patent Number: 5,168,815
[45] Date of Patent: Dec. 8, 1992

[54] RAILROAD CAR MOVING VEHICLE

[75] Inventors: Glen S. Comer, The Woodlands; Robert E. Crockett, Katy, both of Tex.

[73] Assignee: Stewart & Stevenson Services, Inc., Houston, Tex.

[21] Appl. No.: 738,844

[22] Filed: Jul. 31, 1991

[51] Int. Cl.⁵ .............................................. B61C 9/08
[52] U.S. Cl. .................................. 105/72.2; 213/75 R; 213/7; 213/2
[58] Field of Search ............... 105/26.05, 26.1, 72.2, 105/215.2, 157.1, 179, 182.1, 206.1, 218.2, 226; 213/2, 75 R, 3, 4, 5, 7, 8, 9, 50; 280/479.1, 478.1, 496, 468, 490.1

[56] References Cited

U.S. PATENT DOCUMENTS

| | | |
|---|---|---|
| 2,253,042 | 8/1941 | Muchnic ........................ 105/182.1 |
| 2,718,195 | 9/1955 | Bock et al. .......................... 105/90 |
| 2,722,897 | 11/1955 | Morey ................................. 105/73 |
| 3,118,688 | 1/1964 | Stilley ............................... 280/447 |
| 3,198,137 | 8/1965 | White ................................. 105/26 |
| 3,232,241 | 2/1966 | White ................................. 105/75 |
| 3,399,633 | 9/1968 | Herscovitch ..................... 105/26.1 |
| 3,420,191 | 1/1969 | White ................................. 105/73 |
| 3,487,448 | 12/1969 | Stemmerman et al. ............ 280/468 |
| 3,633,514 | 1/1972 | Deike ............................ 105/26 R |
| 3,709,153 | 1/1973 | Herscovitch ........................ 105/26 |
| 3,826,202 | 7/1974 | Russell-French ................ 105/182.1 |
| 3,884,156 | 5/1975 | Ames et al. ........................ 105/26 |
| 4,843,973 | 7/1989 | Hartelius et al. ................ 105/26.1 |

FOREIGN PATENT DOCUMENTS

| | | |
|---|---|---|
| 1245757 | 7/1967 | Fed. Rep. of Germany ... 280/479.1 |
| 0619744 | 3/1949 | United Kingdom ............... 280/468 |

Primary Examiner—Robert J. Oberleitner
Assistant Examiner—Mark T. Le
Attorney, Agent, or Firm—David A. Rose

[57] ABSTRACT

A railroad car moving vehicle has a main frame on which are mounted front and rear axles with steel wheels for engaging the railroad track. Front and rear coupler assemblies have a set of coupler arms with a cross rail member extending between one end of the arms. A coupler is reciprocally mounted on the cross rail member and adapted for coupling with the railroad car. The other ends of the coupler arms are rotatably mounted on a pivot shaft supported by the main frame. The pivot shaft extends between opposed sides of the main frame at its center line. Each set of front and rear coupler arms are mounted on a common pivot shaft such that the horizontal portion of any shock load imparted to one coupler will pass directly through the pivot shaft to the other coupler and not to the main frame. Each end of the pivot member is supported by an isolator assembly. Each isolator assembly is mounted on the main frame and includes a resilient mount. The resilient mount absorbs and dampens any shock load imparted to the coupler assemblies and thus reduces the shock load and vibration on the main frame of the vehicle.

20 Claims, 4 Drawing Sheets

RAILROAD CAR MOVING VEHICLE

BACKGROUND OF THE INVENTION

This invention relates generally to vehicles for moving railroad cars and more particularly to railroad car moving vehicles of the type having convertible sets of wheels, one set being track wheels permitting use of the vehicle on the rails of a railroad track and another set being rubber wheels allowing the vehicle to operate on ground surfaces.

Railroad car moving vehicles are used for moving railroad cars without the need for locomotives. Such vehicles are capable of operating both on the railroad track for the moving of railroad cars or on the ground for moving the railroad car moving vehicle between railroad tracks. Such a vehicle is sometimes referred to as a rubber-rail car. When the railroad car moving vehicle is operated on the railroad track, the rubber tired ground wheels are retracted to a position above the rails on each side of the vehicle. When the track wheels are no longer required, the ground wheels are lowered and locked in place so that the vehicle can travel over the ground.

Railroad cars or other railway rolling stock are equipped with knuckle-type couplers. The railroad car moving vehicle also includes knuckle-type couplers mounted on drawbar works cradled in the front and rear ends thereof for coupling engagement with the conventional knuckle-type coupler of an adjacent railroad car. The drawbar works is supported at one end of the vehicle on a pair of radial arms pivotally carried on pivot pins mounted on the vehicle frame at a level below the axle of the driving wheels. The pins serve as a pivot point for the radial arms so that the coupler can pivot up and down at the pivot point. The front end of the drawbar works is supported on the vehicle frame above the driving wheel axle. A hydraulic ram, pivotally connected between the vehicle frame and drawbar works, swings the drawbar works about its radial arm pivots to raise the drawbar works relative to the frame.

Upon coupling the vehicle to the railroad car, a portion of the weight of the railroad car is transferred to the vehicle by lifting the car coupler. The railroad car has a suspension system with springs and a large pin which extends downwardly towards the axle of the railroad car. The axle is separate from the car itself. Even though the weight is lifted off the axle of the car by the vehicle, the wheels on the axle of the railroad car continue to engage the track. The vehicle uses a portion of the railroad car weight to increase traction of the propelling force of the vehicle. Since the tractive force is borrowed from the weight of the railroad car to be propelled, the vehicle itself may be relatively light in weight.

The coupling between the drawbar works and the car coupler lifts the railroad car causing the drawbar works to support a portion of the weight of the railroad car. This weight is transferred back to the frame of the vehicle. The amount of initial loading of the vehicle frame from the railroad car is controlled by extension of the hydraulic ram.

The railroad car moving vehicles of the prior art have several disadvantages. In particular, prior art vehicles experience excessive shaking, vibration and shock causing the vehicles to lose traction and thus acceleration. Further, the ride is uncomfortable for the driver.

The prior art vehicle is all rigidly mounted. There is merely a mechanical linkage between the wheels of the vehicle and the railroad car itself. When the coupler on the vehicle lifts the railroad car and supports a portion of the load, the load is transferred to the wheels of the vehicle and the coupler takes all of that load. This load may actually split the foundation of the coupler.

When the vehicle is coupled to the railroad car, a severe loading impact is absorbed by the vehicle coupler. The prior art couplings are constantly being damaged by the shock load during the coupling operation. Often, the roller bearings break. Some prior art couplers have rubber mounted in the coupler itself. A round rubber donut is installed around the coupler spindle. Such a rubber element has some effect but still does not substantially reduce the shock.

The rigid mounts of the prior art vehicle creates a steel path from the railroad car coupler to the ground. As the vehicle and railroad car travel on the track, any interruptions in the rails over which either the railroad car that is being lifted or vehicle passes, cause steel constrained dynamics to occur. Steel is unforgiving in the absorption of energy. Thus, the energy and load pass right to the frame of the vehicle. This causes a shaking, vibration or shock to the vehicle. The shock of connecting the railroad car only occurs once, but as the vehicle travels over the rails in a steel system repeated vibrations occur to the vehicle making it uncomfortable for the driver and a maintenance problem for the vehicle.

Shock is also caused when the drive is over-loaded and the wheels slip. The slippage of the steel wheels on the steel track causes a steel on steel slip condition which produces a shock to the vehicle. The slippage of the wheels causes an up and down movement or vibration. This vibration is felt by the driver of the vehicle.

Normally, the vehicle is used only to move a single string of railroad cars and generally does not have a car coupled to both ends of the vehicle. However, often the vehicle is damaged because the vehicle has been attached to a railroad car at both ends.

SUMMARY OF THE INVENTION

The present invention includes a railroad car moving vehicle having a main frame on which are mounted front and rear axles with steel wheels for engaging the railroad track. The invention further includes front and rear coupler assemblies which have a set of coupler arms with a cross rail member extending between one end of the arms. A coupler is reciprocally mounted on the cross rail member and adapted for coupling with the railroad car. The other ends of the coupler arms are rotatably mounted on a pivot shaft supported by the main frame. The pivot shaft extends between opposed sides of the main frame at its center line. Each set of front and rear coupler arms are mounted on a common pivot shaft such that the horizontal portion of any shock load imparted to one coupler will pass directly through the pivot shaft to the other coupler and not to the main frame. Each end of the pivot member is supported by an isolator assembly. Each isolator assembly is mounted on the main frame and includes a resilient mount. The resilient mount absorbs and dampens any shock load imparted to the coupler assemblies and thus reduces the shock load and vibration on the main frame of the vehicle. This reduced shock load on the frame of the vehicle reduces the slippage of the wheels.

The isolator assemblies substantially improve the ride of the vehicle. The isolator assemblies absorb and dampen the vibration, load and shock impact passing between the coupler assemblies and main frame. Such vibration, impact and shock load may be caused by the wheels rolling over irregular track and pass from the wheels to the coupler assemblies which are supporting a portion of the load of the railroad car. Further, such vibration, load or shock impact may be caused by the coupling of other cars or the carrying of the load of the railroad car and pass from the coupler assemblies to the main frame. The resilient mounts in the isolator assemblies absorb and dampen this passage of the vibration, load and shock impact to substantially reduce the wear and thus the maintenance of the vehicle. Such is a substantial improvement over the prior art vehicle which has rigid mounts causing the vibrations, load and shock impact to pass through the steel linkage and thus throughout the vehicle.

The common pivot shaft provides substantial advantages over the individual pivots used by the coupler arms of the prior art. It is particularly advantageous when a railroad car is coupled to each end of the vehicle. Due to the increased momentum produced by the increased weight of a railroad car being coupled to one end of the vehicle, the shock impact of coupling the other end of the vehicle to another railroad car is substantially increased. Momentum equals the velocity times the mass of the vehicle and coupled railroad car. If either the velocity or weight is increased, the momentum is increased, thus increasing the shock impact. Thus, if the vehicle is connected to a string of railroad cars and is attempting to attach another railroad car to the other end of the vehicle, there is a tremendous increase in momentum producing a substantial likelihood of damage to an unprotected system. The vehicle often weighs 40,000 pounds and may be coupled to a railroad car weighing over 200,000 pounds. Such weight can produce substantial damage.

A single pivot shaft has the further advantage of being more economical. Manufacturing costs are reduced by almost one-half. If two pivot shafts were to be used, the cost would double since structurally, the coupler arms and shaft would have to be the same size as those of the present invention. Further, the present invention greatly simplifies the construction of the vehicle by reducing the number of parts and their complexity, thus reducing overall costs. Further, the single shaft has also been found to be more durable thus reducing maintenance costs.

It should also be noted that if two pivot shafts are used, a larger hydraulic piston cylinder would be required to lift the coupler assemblies. The hydraulic piston cylinder must lift against the pivot point and a shorter coupler arm substantially reduces the mechanical advantage. Thus, the single pivot shaft produces additional manufacturing advantages.

The present invention also locates the pivot shaft below the hitch point. Some prior art vehicles locate the pivot point above the hitch point such that upon impact it is possible for the vehicle to bounce off the track if it engages the railroad car too hard. By locating the pivot shaft below the hitch point, the impact with the railroad car tends to push the car downwardly thus avoiding lifting the vehicle off of the track.

The present invention reduces the amount of overhaul required to the vehicle. In the prior art, extensive damage occurs to the vehicle after a period of use of two or three years. The present invention reduces the amount of rebuild dollars to the vehicle. This is particularly advantageous in the leasing of vehicles.

Other objects and advantages of the invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 2:
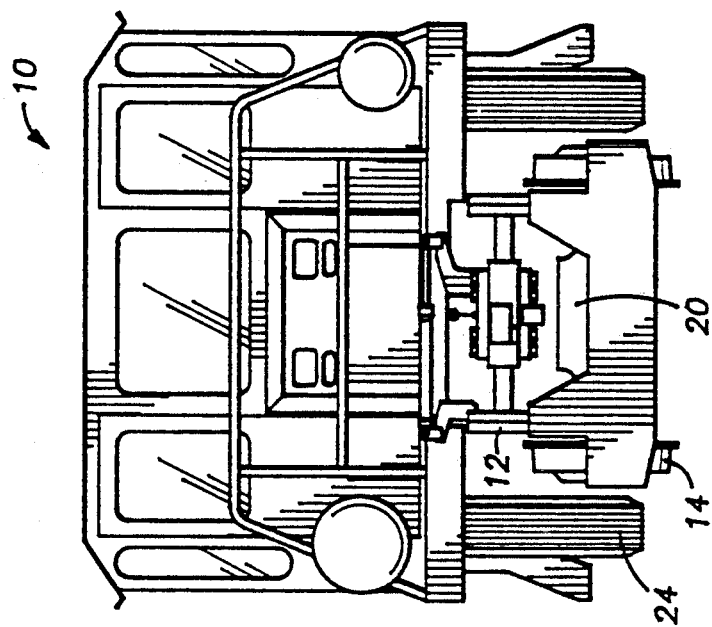
FIG. 2 is an end elevational view of the railroad car moving vehicle shown in FIG. 1.
Figure 1:
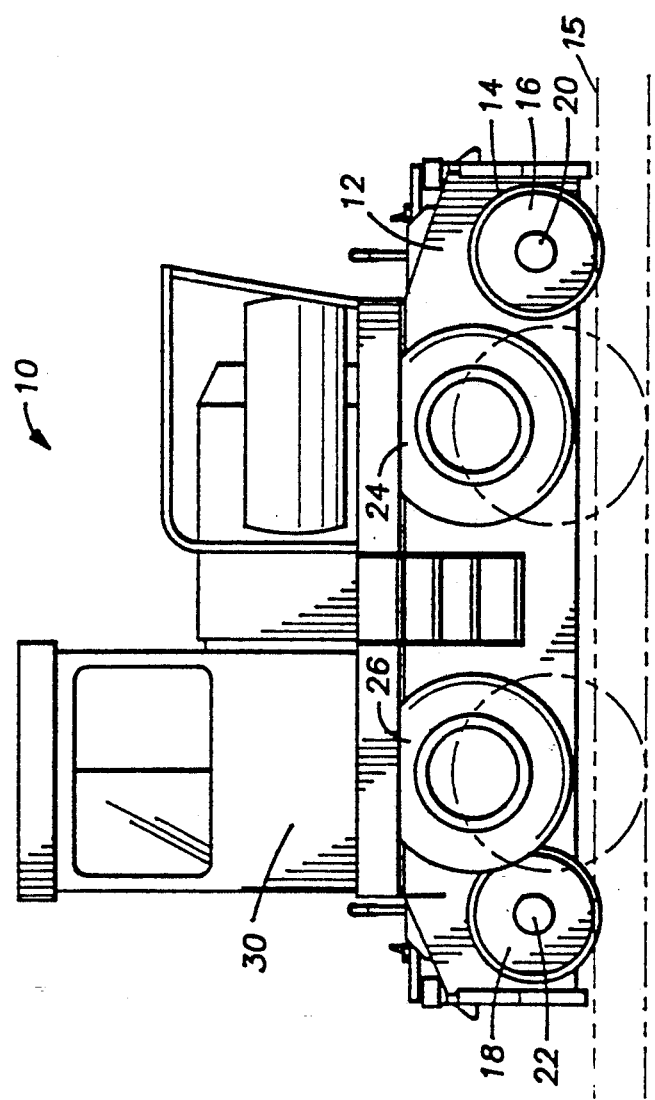
FIG. 1 is a side elevational view of the railroad car moving vehicle incorporating the principles of the present invention.
Figure 10:
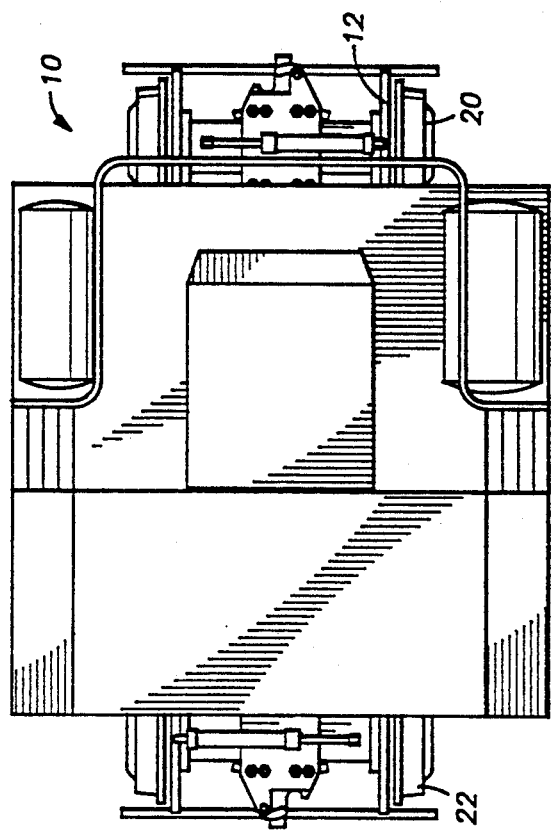
FIG. 10 is a top view of the railroad car moving vehicle shown in FIG. 1.

Referring initially to FIGS. 1, 2 and 10, the railroad car moving vehicle 10 incorporating the principles of the present invention includes a main frame 12 to which the rail wheels 14 are mounted for operation when the vehicle 10 travels on the railroad track 15. There are two sets of flanged rail wheels 14 including a front rail wheel set 16 and a rear rail wheel set is. The front set of rail wheels 16 and the rear set of rail wheels 18 are rotatably mounted on the opposite ends of a front axle 20 and a rear axle 22, respectively.

The railroad car moving vehicle 10 also includes a front ground wheel set 24 and a rear ground wheel set 26 for driving the vehicle 10 on the ground 28. The wheel sets 24, 26 are preferably a pair of pneumatic rubber tires which may be raised and lowered hydraulically by hydraulic cylinders (not shown) mounted on the main frame 12 of the vehicle 10.

The vehicle 10 is powered by a suitable prime mover, such as a motor or engine (not shown). The engine not only provides the power for propelling and driving the rail wheel sets 16, 18 but also provides the power for the hydraulic system and electrical system on the vehicle 10. The power system will not be described further since the details of the power system and related drive train are well known in the art.

A cab 30 with independent suspension is mounted on the main frame 12. The driver of the vehicle 10 rides in the cab 30 for the operation of the vehicle 10 and its related drive and hydraulic systems.

Figure 3:
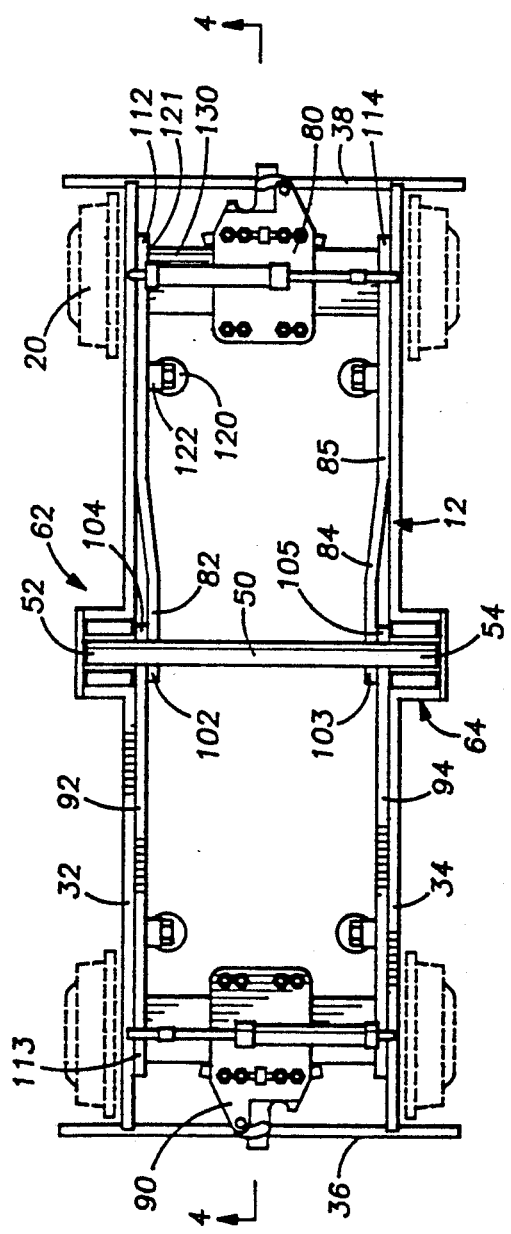
FIG. 3 is a top plan view of the frame of the railroad car moving vehicle in which the superstructure of the vehicle has been removed.
Figure 4:
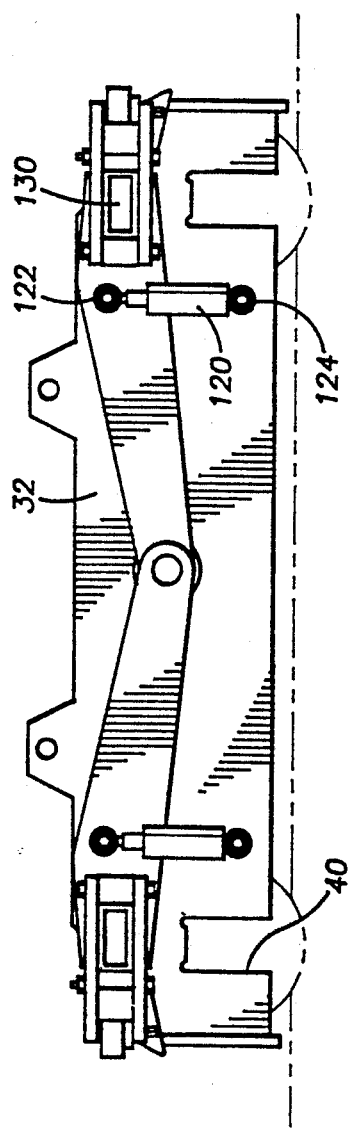
FIG. 4 is a side cross-sectional view at plane 4—4 of the frame of the railroad car moving vehicle shown in FIG. 3.

Referring now to FIGS. 3 and 4, the main frame 12 includes two side rails 32, 34 and two end beams, i.e., rear end beam 36 and front end beam 38. Side rails 32, 34 include a pair of front notches 40 and rear notches 42 for receiving front axle 20 and rear axle 22, respectively. Axles 20, 22 may be mounted on side rails 32, 34 in any well known manner, such mounting not being critical in the present invention.

The present invention includes a front and a rear coupler assembly which is mounted to the main frame 12. Each of the coupler assemblies is mounted on a common pivot shaft 50 which extends between the side rails 32, 34 at the center line of the main frame 12. The ends 52, 54 of pivot shaft 50 are supported on side rails 32, 34 by isolator assemblies 62, 64, respectively. The rear coupler assembly includes rear coupler arms 82, 84 which have their ends 112, 114 connected by a cross rail member 130 extending therebetween. A rear coupling 80 is mounted on cross rail member 130 for traversing movement thereon. The front coupler assembly includes front coupler arms 92, 94 connected at their ends by a cross rail member, like that of 130, on which is mounted a front coupler 90. The cross rail members 130 mount couplers 80, 90 above axles 22, 20, respectively, to support the load as the weight of the railroad car is applied to the vehicle 10. The front pair of coupler arms 92, 94 and the rear pair of coupler arms 82, 84 have their free ends mounted on pivot shaft 50.

Figure 6:
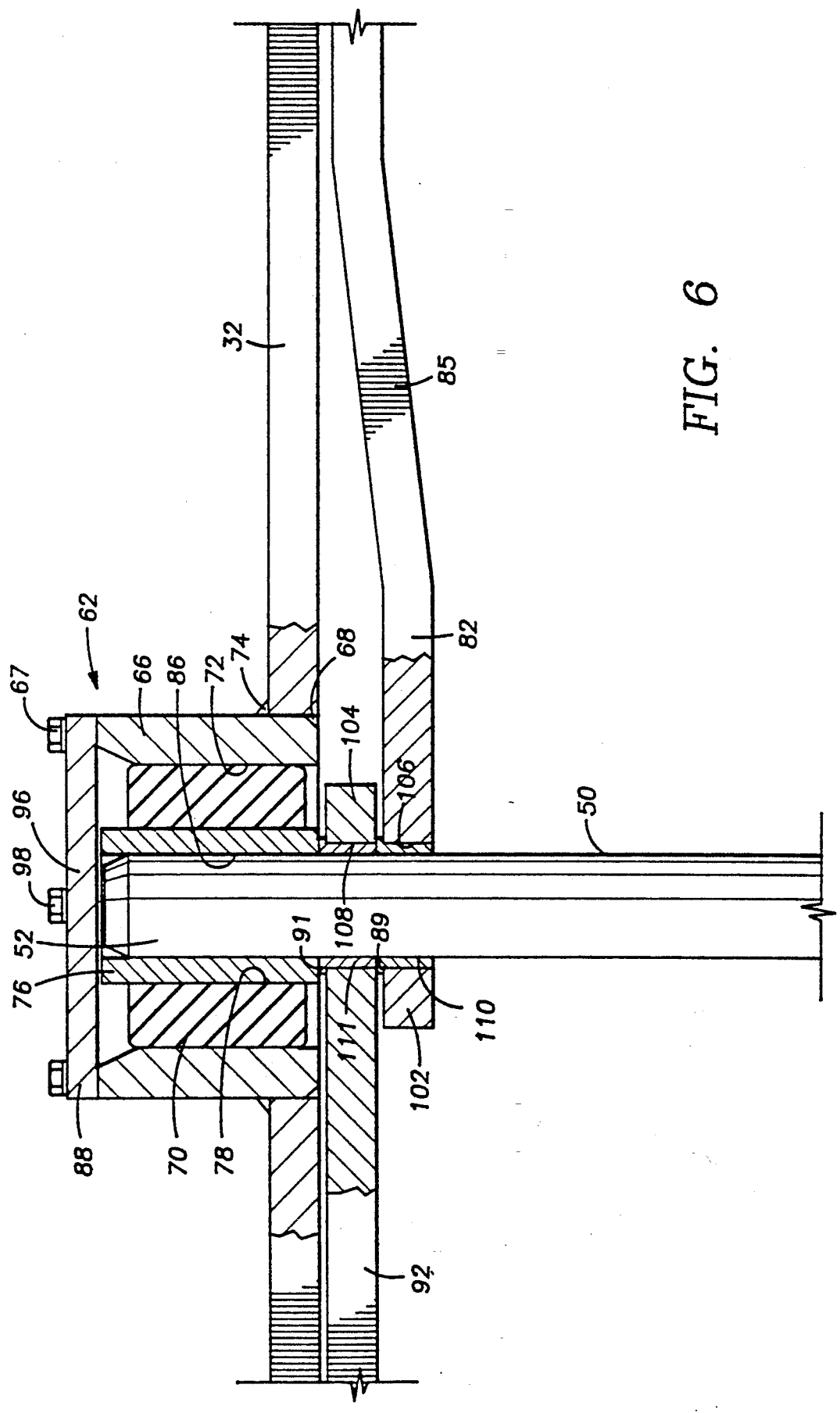
FIG. 6 is an enlarged top plan view of the isolator shown in FIG. 3.

Referring now to FIG. 6, there is shown an enlarged view of isolator assembly 62. It should be appreciated that since isolator assemblies 62, 64 are the same, that a description of isolator assembly 62 will also describe isolator assembly 64. Isolator assembly 62 includes a steel housing 66 having one end extending through an aperture 68 in side rail 32. The steel housing 66 is preferably a cylindrical member, such as a pipe, having an inner bore 72. Cylindrical steel housing 66 is received by aperture 68 and welded to side frame 32 at 74.

A resilient mount 70 is housed within bore 72 of steel housing 66. Resilient mount 70 is preferably donut or cylindrical shaped forming an inner bore 78. Resilient mount 70 may be of any resilient material such as plastic or is preferably an elastomeric material such as rubber. It is preferred that the rubber have a durometer hardness in the range of 70 to 100 and preferably a durometer hardness of 85. It should be appreciated that resilient mount 70 may be made of any material or other device which has dampening characteristics. For example, it can be seen that resilient mount 70 may include a hydraulic device which has a bladder housed in the annulus formed between the bushing 76 and the wall of bore 72. Resiliency may then be adjusted by varying the hydraulic pressure within the bladder to vary the dampening characteristics of isolator assembly 62.

A bushing 76 having a length approximating the length of bore 72, is molded into bore 78 of resilient mount 70. The process of press fitting the resilient member 70 into bore 72 adds additional stiffness to the isolator assembly 62. This additional stiffness enhances the load absorption capability of isolator assembly 62.

Pivot shaft end 52 is received within the cylindrical bore 86 of bushing 76 so as to have a loose running fit therein. The outer end of steel housing 66 is closed with an end cover 88 bolted into steel housing 66 by bolts 67. The end cover 88 merely holds the assembly in place. End cover 88 includes an aperture 96 to allow the insertion of a steel bolt 98 adapted for threading into the terminal end 52 of pivot shaft 50. Bolt 98 is used for installation purposes as hereinafter described.

The inner free ends 102, 103 of rear coupler arms 82, 84, respectively, and the inner free ends 104, 105 of front coupler arms 92, 94, respectively, are mounted on pivot shaft 50. Rear coupler arms 82, 84 have an offset, such as at 85, so that the other terminal ends 112, 114 of rear coupler arms 82, 84 are aligned with terminal ends 113, 115 of front coupler arms 92, 94. The front pair of coupler arms 92, 94 do not have an offset which is the only difference between the two sets of coupler arms. Ends 102, 103 and 104, 105 include apertures 106, 108 which house bearing bushings 110, 111, respectively, to allow the easy rotation of coupler arms 82, 84 and 92, 94 on pivot shaft 50.

Bearing bushings 110, 111 house journal bearings and each have an integral annular flange 89, 91, respectively. Flange 89 locates the coupler arms against the bushings 110, 111 and keeps the two adjacent coupler arms from touching. Flange 89 holds the bearing bushings 110, 111 in place while acting as a clearance between the adjacent coupler arms. Flange 91 engages the end of bushing 76 and acts as a clearance between coupler arm 92 and side rail 32. Bearing bushings 110, 111 are pressed into the apertures 106, 108 of the coupler arms.

In assembling the pivot shaft 50 and coupler arms 82, 84, 92, 94 with isolator assemblies 62, 64, the bearing bushings 110, 111 are already press fitted into the apertures 106, 108 of the coupler arms. The pivot shaft 50 is then threaded through the bushing 76 of isolator assembly 64 and through the two sets of bearing bushings 110, 111 on the inner free ends 102, 103 and 104, 105 of coupler arms 82, 84 and 92, 94. The pivot shaft 50 has a loose running fit within bearing bushings 110, 111.

One end of pivot shaft 50 is then bolted to an end cover 88. This anchors that end of pivot shaft 50 to the main frame 12. A long threaded rod (not shown) is then threaded into the other end of pivot shaft 50. One of the resilient mounts 70 is then installed over the threaded rod. One end of the threaded rod is then received through aperture 96 of the other end cover 88 and a nut is threaded onto the end of the rod. As the nut is turned on the end of the threaded rod, the end cover 88 bears against the resilient mount 70 to press fit the resilient mount 70 into the annulus formed by steel housing 66 and shaft 50. Approximately 10,000 pounds of force is required to push the resilient mount 70 into the annulus. Once that resilient mount 70 is in place, then the procedure is reversed to install a resilient mount 70 in the housing of the other isolator assembly.

Figure 5:
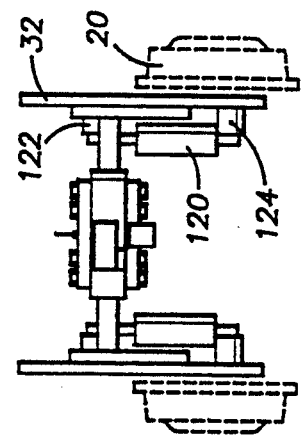
FIG. 5 is an end elevational view of the frame of the railroad car moving vehicle shown in FIGS. 3 and 4.

Referring now to FIGS. 3, 4, and 5, both of the coupler assemblies include a hydraulic piston and cylinder 120 for each of the coupler arms 82, 84 and 92, 94 to raise and lower the rear and front couplers 80, 90, respectively. The hydraulic piston and cylinders 120 are preferably 5 inch cylinders with a 6 inch stroke. As best shown in FIGS. 4 and 5, an upper pin 122 is projects from the inside of coupler arm 82 and a lower pin 124 is projects from the inside of side rail 32 interior of the rear axle 20. The lower pin 124 is cantilevered from side rail 32 such that it is aligned with upper pin 122 such that hydraulic piston and cylinder 120 will extend therebetween. The pins 122, 124 receive the ends of hydraulic piston and cylinder 120. Fluid pressure is metered into the cylinders causing the piston rod to extend from the cylinder upon hydraulic actuation so as to lift or jack the free end of coupler arms 82, 84 as the opposite ends of arms 83, 84 pivot on pivot shaft 50. The greater the pressure, the higher the piston is raised so as to lift the coupler and adjacent railroad car.

The terminal ends 112, 114 of coupler arms 82, 84, respectively, are welded at 121 to cross rail member 130. Cross rail member 130 has a rectangular cross section and extends from free end 112 of rear coupler arm 82 to free end 114 of coupler arm 84. Thus, as rear coupler arms 82, 84 are pivoted on pivot shaft 50 by means of the hydraulic piston and cylinders 120, cross rail member 130 is also raised and lowered.

A nominal running clearance is provided between the coupler arms 82, 84 and side rails 32, 34, respectively. This clearance is preferably ¼ inch. This running clearance allows some side movement of the coupler arm assembly between the side rails 32, 34 of the main frame 12 so as to avoid breaking welds 121 as side loads are placed on the couplings. If a side load is applied, such as by a derailment, the welded joint 121 can not be overloaded. Upon a side load being applied, the coupler assembly merely engages the inner side of side rails 32, 34 to prevent breaking welds 121. This engagement relieves any further loading on the coupler assembly to protect the weld joint 121.

Figure 7:
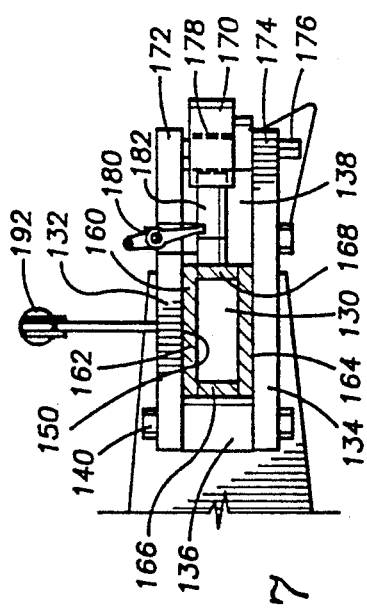
FIG. 7 is an enlarged view of the coupler mounted on the cross rail member shown in FIG. 4.

Referring now to FIGS. 3 and 7, the rear coupler 80 forms a sandwich around cross rail member 130. Rear coupler 80 includes an upper plate 132 and a lower plate 134. Plates 132, 134 extend across the longitudinal cross sectional side of cross rail member 130. Inner and outer shims 136, 138, respectively, are disposed between upper and lower plates 132, 134. Fastening means such as bolts 140 extend through aligned apertures in upper and lower plates 132, 134 and a corresponding aperture in shims 136, 138. Upon assembly, coupler 80 forms a rectangular cross sectioned channel 150 which traverses the length of cross rail member 130.

Rectangular aperture 150 is lined with a anti-friction material 160. The anti-friction material 160 is preferably an oil filled nylon or an ultra high molecular weight plastic which serves as an anti-friction bearing. The anti-friction material 160 is the equivalent of a sealed bearing. The anti-friction material 160 includes upper and lower horizontal shock pads 162, 164 and two vertical shock pads 166, 168. Pads 162, 164 and 166, 168 are preferably one inch thick and are maintained within the rectangular cross sectioned channel 150 by stops welded within channel 150. Material 160 replaces the rollers previously used by the prior art. The pads have a large load carrying capacity because of the large area of the pads. Also, the pads require minimal maintenance.

Referring now particularly to FIG. 7, upper and lower plates 142, 144 include projecting cantilevered portions 172, 174, respectively, for supporting a coupling knuckle 170. A pin 176 projects through apertures in extending portions 172, 174 and through a bore 178 in knuckle 170 to pivotably mount knuckle 170 on coupler 80. Knuckle 170 swings out to couple with the coupling of an adjacent railroad car and then swings in to lock the coupling together. A locking assembly 180 is also mounted on coupler 80. Locking assembly 180 includes a locking pin 182 which engages with one end of knuckle 170 for locking knuckle 170 in the closed and engaged position.

Figure 8:
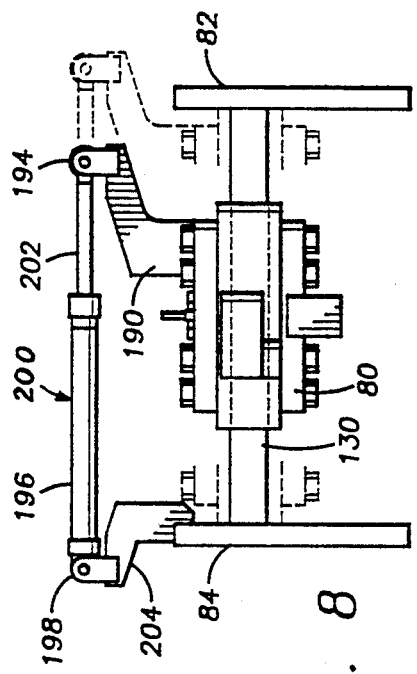
FIG. 8 is an end elevational view of the coupler and alignment hydraulic member.
Figure 9:
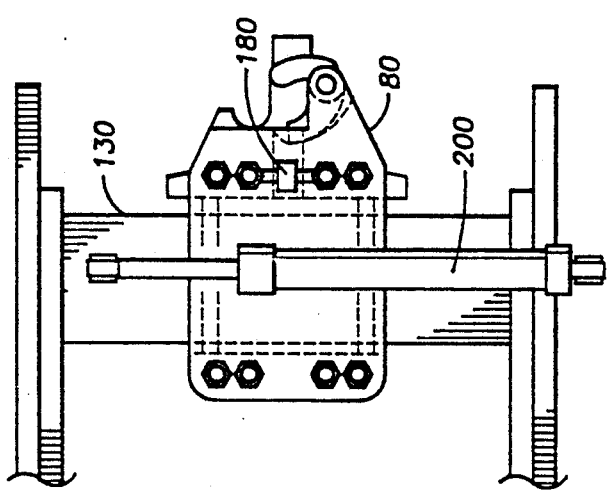
FIG. 9 is a top view of the coupler shown in FIG. 8.

Referring now to FIGS. 8 and 9, there is shown an alignment hydraulic piston and cylinder assembly 200 mounted on coupler 80 for reciprocating coupler 80 on cross rail member 130. A like assembly 200 is mounted on coupler 90. Coupler 80 includes an upwardly projecting arm 190 connected by a clevis 192 to the free end 194 of hydraulic assembly 200. The cylinder 196 has the end 198 opposite piston 202 connected to an arm 204 projecting upwardly from side rail 34.

Assembly 200 moves couplers 80, 90 from side to side on member 130. FIG. 8 illustrates three different positions of coupler 80 on cross rail member 130, i.e. left, center, and right positions. Assembly 200 aligns couplings 80, 90 for mating with an adjacent railroad car and for maintaining alignment during operation. Assembly 200 spots the coupler and aligns it with the coupler of the adjacent railroad car for connection. It is necessary to align the knuckle 120 so that it will enter the coupler of the adjacent railroad car. The cylinder of assembly 200 is also free floating in normal operating conditions so that as the railroad car goes around a curve, the coupler will shift slightly under load.

In the operation of connecting the rear coupler 80 to an adjacent railroad car, the knuckle 70 is released by the locking pin 182 of locking assembly 180 and swung to the open position. The vehicle 10 is placed in reverse and backed up toward the adjacent railroad car. The complimentary knuckle on the coupler of the railroad car may or may not be in the open position. Once vehicle 10 is near the adjacent railroad car, the driver actuates the alignment hydraulic piston and cylinder assembly 200 to move rear coupler 80 on cross rail member 130 to align rear coupler 80 with the coupler on the adjacent railroad car. Also, hydraulic piston and cylinder 120 may be actuated to raise or lower the rear coupler 80 so as to be at the proper height for the knuckle 170 of rear coupler 80 to receive the complimentary knuckle on the coupler of the adjacent railroad car. As previously described, the hydraulic piston and cylinders 120 are mounted between the main frame 12 and rear coupler arms 82, 84 so as to pivot coupler arms 82, 84 on pivot shaft 50 thereby raising or lowering rear coupler 80.

Once properly positioned, the vehicle 10 is backed into the adjacent railroad car causing the rear coupler 80 to engage and close with the coupler on the adjacent railroad car. The locking assembly 180 then engages locking pin 182 to lock knuckle 170 in the closed and engaged position.

The impact of the engagement of rear coupler 80 to the coupler of the adjacent railroad car imparts a shock load onto the vehicle 10. This shock load travels through the rear coupler 80, cross rail member 130 and rear coupler arms 82, 84. A vertical portion of the shock load is imparted onto the hydraulic piston and cylinders 120 with rear coupler 80 being mounted just above rear axle 22. The horizontal portion of the shock load travels the length of the rear coupler arms 82, 84 and is transferred to the pivot shaft 50. However, with the ends 52, 54 of pivot shaft 50 being mounted in isolator assemblies 62, 64, the shock load is absorbed by resilient elements 70. Thus, resilient elements 70 absorb and dampen the shock load and totally change the dynamic characteristics of the main frame 12 of vehicle 10 as compared to the all steel structure of prior art railroad car moving vehicles.

Once the rear coupler 80 is engaged with the coupler of the adjacent railroad car, the hydraulic piston and cylinders 120 mounted on coupler arms 82, 84 are activated to lift one end of the railroad car. The lower plate 134 of rear coupler 80 extends beneath the complementary knuckle of the coupler of the adjacent railroad car. This lower plate 134 supports the coupling of the adjacent railroad car such that that end of the railroad car is lifted on the suspension of the railroad car. Generally, approximately one-half of the viable weight of the railroad car is lifted by the hydraulic piston and cylinders 120 of vehicle 10. The load from each of the railroad cars is located over each of the adjacent axles on the vehicle 10. Thus, the load of one railroad car is not transferred via the central pivot shaft to the axle on the other end of the vehicle 10.

It is, of course, necessary that the adjacent railroad car not be lifted to a height which would cause the wheels on the railroad car to lose contact with the track. If the wheels of the railroad car were lifted off the track, the wheels would no longer guide the railroad car. The possibility of completely lifting the wheels off the track could occur if the railroad car were lightly loaded. Upon raising the adjacent railroad car, the weight of the railroad car is transferred to the vehicle 10. The driver of the vehicle 10 may vary the amount of lift of the adjacent railroad car by vehicle 10. Where the track moves over rough ground, the lift is varied so that the vehicle 10 is properly loaded.

The load imparted to the pivot shaft 50 by coupler arms 82, 84 and thus to isolator assemblies 62, 64 varies with the load. The load causes the resilient member 70 to deflect and act as a spring on the main frame 12. An 45,000 pound load being placed on the coupling will place a 33,000 pound total vertical load on isolator assemblies 62, 64.

This disposition of the resilient element 70 is isolator assemblies 62, 64 between the load and the wheels 24, 26 of vehicle 10, substantially reduces the shock load and vibrations imparted onto vehicle 10 during operation. As previously discussed, the coupling of vehicle 10 to a railroad car imparts a shock load onto vehicle 10 and the raising of the railroad car applies a load to vehicle 10. Further, a shaking, vibration or other shock is imparted to vehicle 10 as it travels over steel rails or when the steel wheels 24, 26 of vehicle 10 slip on the steel track. The isolator assemblies 62, 64 dampen the vibrations induced from the load, particularly as the vehicle 10 passes over irregular steel tracks.

The isolator does not wear under use, but the material of the resilient mount 70 does age. However, the operation of the vehicle 10 is in an environment which preserves aging and thus the isolator should last the life of the vehicle 10.

With the reduction of the vibration of vehicle 10 during travel, vehicle 10 is capable of pulling heavier railroad cars and/or a longer string of railroad cars because the wheels 24, 26 will not move up and down on the track and cause them to slip on steel rails 15. Further, vehicle 10 is able to accelerate faster so as to move a greater number of railroad cars up a grade faster. Since most of the operation of vehicle 10 is acceleration and braking, the reduced vibration reducing slippage permits vehicle 10 to handle a larger number of heavily loaded railroad cars. Acceleration is faster because wheels 16, 18 do not slip on the track 15. Thus, vehicle 10 is able to achieve higher speeds before it is necessary to brake and slow vehicle 10.

There is the additional advantage of enhancing the life of vehicle 10. By reducing the vibration and impact on the driver, main frame 12, and the couplers 80, 90, the vehicle 10 receives less punishment during operation and thus the cost of repair and maintenance is reduced.

Even though coupler arms 82, 84 and 92, 94 share the same pivot shaft 50, each pair of coupler arms is independent and provides a direct connection between the two pairs of coupler arms. This direct connection permits the direct transfer of the shock load from one pair of coupler arms to the other during the coupling operation. It should be appreciated, however, that a single pivot shaft 50 is not required by the present invention and many of the advantages of the present invention would be achieved even if each set of the coupler arms 82, 84 and 92, 94 were mounted on their own individual pilot shaft with individual isolator assemblies mounted on the ends of the pilot shafts. The dampening effect of the isolator assemblies minimizing the transfer of the vibrations and shock load to the wheels 24, 26 would still be achieved. However, the passage of the shock load horizontally from a railroad car attached to the rear of vehicle 10 to a railroad car to be attached to the front of vehicle 10 would not be achieved.

Another substantial benefit of the present invention is the reduction of shaking, vibration and shock placed on the driver of vehicle 10. The substantially improved ride of vehicle 10 greatly increases the comfort of the driver and his ability to operate the vehicle safely.

The single pivot shaft 50 is particularly advantageous when vehicle 10 is to couple with a railroad car after it already has been coupled to another railroad car. For example, occasionally vehicle 10 will have its rear coupler 80 coupled to one or more railroad cars and it is necessary for vehicle 10 to be coupled at its front coupler 90 to another railroad car. The added weight of the coupled railroad cars at rear coupler 80 greatly enhances the momentum of vehicle 10 as it approaches and couples with the other railroad car at front coupler 80. This increased momentum greatly increases the shock load at the time of coupling. Were the horizontal portion of this enhanced shock load not directly transferred from the front coupler 90 to the rear coupler 80 by means of the direct connection between the two pairs of coupler arms 82, 84 and 92, 94 at pivot shaft 50, that shock load would be imparted directly to the main frame 12 of vehicle 10. The present invention has a further advantage of the dampening of this shock load through the use of isolator assemblies 62, 64.

While a preferred embodiment of the invention has been shown and described, modifications thereof can be made by one skilled in the art without departing from the spirit of the invention.

What is claimed is:

1. An isolator assembly for mounting a coupler on a vehicle for moving a railroad car which applies a shock load to the vehicle, comprising:
   a frame;
   first and second housings with apertures therethrough mounted on opposed sides of the frame;
   a pivot member extending between the opposed sides of the frame and having first and second ends extending into said apertures of said first and second housings;
   a coupler arm pivotally linked to said pivot member and extending to the coupler for mounting the coupler; and
   first and second resilient members disposed within said first and second housings around said first and second ends of said pivot member whereby said resilient member dampens the shock load imposed on the vehicle through the coupler.

2. The isolator assembly of claim 1 further including a bushing mounted between said resilient members and said ends.

3. The isolator assembly of claim 1 wherein said resilient members are made of rubber.

4. The isolator assembly of claim 3 wherein said rubber has a durometer hardness in the range of 70 to 100.

5. The isolator assembly of claim 1 wherein said resilient members are press fitted into said housings.

6. The isolator assembly of claim 1 wherein said housings are conduits having an end cover, said resilient members being in the form of a donut having a central aperture for receiving a bushing, and said bushing receiving said end of said pivot member.

7. A coupler assembly for mounting on a vehicle for moving railroad cars, comprising:
   frame;
   first and second isolator assemblies mounted on the frame and each having a resilient mount;
   a pivot member having ends supported vertically and horizontally by said resilient mounts of said first and second isolator assemblies;
   first and second coupler arms each having one end pivotally mounted on said pivot member;
   a cross rail member extending between other ends of said coupler arms and being affixed thereto; and
   a coupler reciprocally mounted on said cross rail member adapted for coupling with a railroad car.

8. The coupler assembly of claim 7 wherein said pivot member is a shaft passing through bearing bushings mounted in said one ends of said coupler arms.

9. The coupler assembly of claim 7 further including hydraulic means having one end mounted on the frame and another end affixed to one of said coupler arms whereby upon hydraulic actuation of said hydraulic means, said one of said coupler arms being caused to pivot on said pivot member.

10. The coupler assembly of claim 7 further including hydraulic means for reciprocating said coupler on said cross rail member.

11. The coupler assembly of claim 7 wherein said cross rail member extends though an aperture in said coupler and an anti-friction material is disposed in said aperture between said coupler and said cross rail member.

12. The coupler assembly of claim 11 wherein said anti-friction material is an oil filled nylon.

13. A vehicle having first and second axles mounted on a frame for moving a railroad car comprising:
   a pivot member mounted parallel to the axles at a center line of the frame;
   first and second coupler assemblies having first and second sets of coupler arms, each set of coupler arms having a coupler mounted on one end thereof, each coupler being adapted for coupling with a railroad car; and
   another end of each set of coupler arms being pivotally mounted on said pivot member.

14. The vehicle of claim 13 further including isolator assemblies mounted on opposed sides of said frame and ends of said pivot member being disposed within said isolator assemblies.

15. The vehicle of claim 13 wherein one of said first and second sets of coupler arms is offset so as to align said one ends of said first and second sets of coupler arms.

16. The vehicle of claim 13 further including hydraulic piston and cylinder means mounted on each one of said coupler arms and extending from the frame for raising and lowering said couplers.

17. The vehicle of claim 13 wherein said pivot member has ends supported by resilient members disposed on the frame.

18. A vehicle for moving a railroad car comprising:
   a frame having opposed side rails;
   an isolator assembly mounted on each of said side rails, each said isolator assembly having a resilient mount;
   a common pivot shaft extending between said side rails and having ends supported by said resilient mounts within said isolator assemblies;
   front and rear coupler assemblies each having a pair of coupler arms, each of said coupler arms having one end connected to a cross rail member and another end mounted on said common pivot shaft;
   front and rear couplers reciprocally mounted on said cross rail members of said front and rear coupler assemblies;
   hydraulic piston and cylinder means extending from said frame to each of said coupler arms whereby upon actuation of said hydraulic piston and cylinder means, said coupler assemblies are raised and lowered by pivoting on said common pivot shaft; and
   alignment hydraulic means mounted on said frame and connected to said couplers for reciprocating said couplers on said cross rail members.

19. The vehicle of claim 18 wherein said resilient mounts are made of rubber disposed between the ends of said common pivot shaft and a housing of said isolator assemblies.

20. The vehicle of claim 18 further including pads of an anti-friction material disposed between said cross rail members and said couplers.

* * * * *